United States Patent [19]
Garrison

[11] Patent Number: 5,328,538
[45] Date of Patent: Jul. 12, 1994

[54] LABELING DEVICE AND METHOD

[75] Inventor: Ronald R. Garrison, Batavia, Ill.

[73] Assignee: Wallace Computer Services, Inc., Hillside, Ill.

[21] Appl. No.: 104,175

[22] Filed: Aug. 9, 1993

[51] Int. Cl.5 .............................................. B32B 31/00
[52] U.S. Cl. .................................... 156/249; 156/268; 156/277
[58] Field of Search ................ 156/247, 249, 268, 277

[56] References Cited
U.S. PATENT DOCUMENTS
4,662,971  5/1987  Adams ........................... 156/277 X
5,161,829 11/1992  Detrick et al. .................. 156/277 X
5,203,851  4/1993  Browning et al. ............... 156/277 X Primary Examiner—David A. Simmons
Assistant Examiner—Paul M. Rivard
Attorney, Agent, or Firm—Tilton, Fallon, Lungmus & Chestnut

[57] ABSTRACT

A labeling device including a release liner and a label where the release liner is imprinted with variable information prior to being equipped with the usual release material, i.e., silicone coating.

1 Claim, 1 Drawing Sheet

U.S. Patent
July 12, 1994
5,328,538
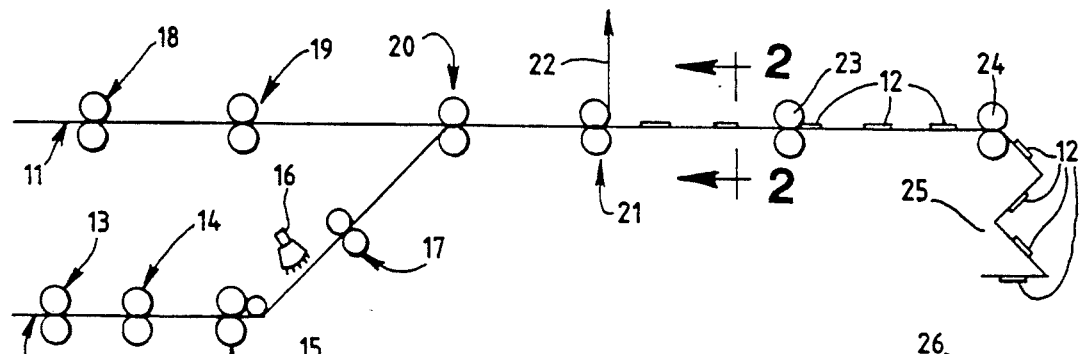
Fig. 1
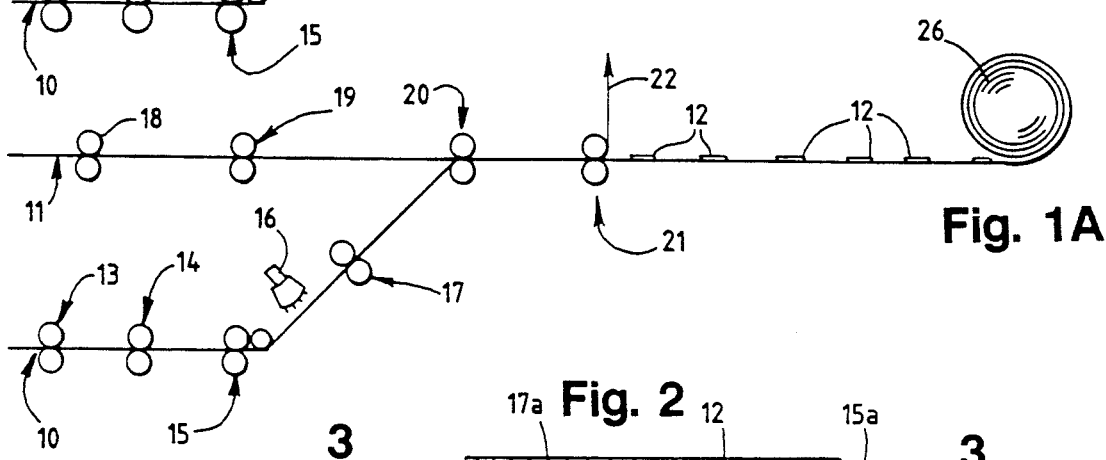
Fig. 1A
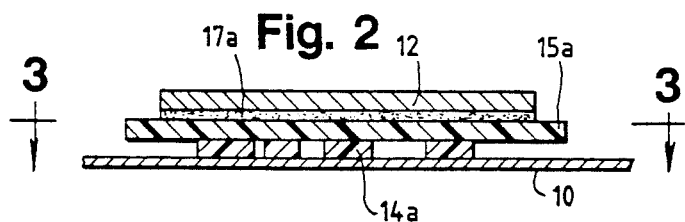
Fig. 2
Fig. 3
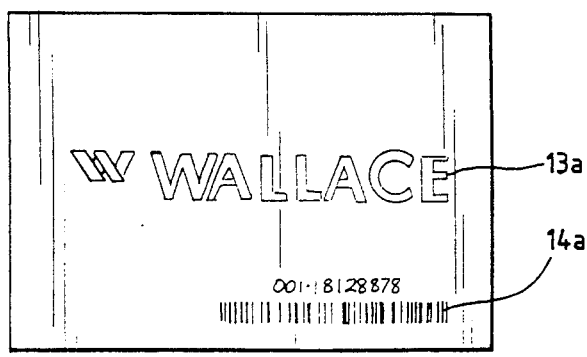

LABELING DEVICE AND METHOD

BACKGROUND AND SUMMARY OF INVENTION

This invention relates to a labeling device and method and, more particularly to a labeling device in which there is action-inducing, instructional printing on the release liner normally associated with a pressure sensitive adhesive-equipped label.

Historically, release liners have not been imprinted because they are thrown away. When a person desiring to use a label pulls the label from the carrier sheet, there is nothing useful normally remaining in the carrier sheet, i.e., the release liner which is made up of an inexpensive paper stock coated with a release material such as a silicone. Occasionally, manufacturers of labels have printed logos on the liner—before coating—but this is not instructional, as for conveying information to be acted upon.

Now, however, I have found a novel use of release liners and in a first advantageous embodiment, the release liner (imprinted before coating) serves as a security device.

As an illustration, some fairly sizeable "big ticket" items such as television sets have their selling price labels switched—so that the person involved can purchase a $2,000 set for $500. This stems from the fact that the label (provided by the manufacturer as part of a business form) carries a bar code or similar indicia which is scanned at the check-out point and the price charged according to the retail store's computer output for that particular bar code. Retail stores have been using removable labels for scanning because of the difficulty at check-out of handling large bulky items so as to subject the labels on the cartons to scanning.

Now, by duplicating the bar code from the label on the release liner, a scanning check may be made to see whether the bar codes on both label and liner (in this particular embodiment) are the same. If not, an attempted fraud is detected.

In general, the use (by imprinting) of an item which previously was thrown away, has many advantageous applications. The release liner itself can be used as an additional copy. It can serve as an inventory control. And outside the realm of point of sale induced actions, it can perform other functions—for example, it can carry instructions. An example is where the purchaser is buying a lawn mower and the label has a warning about use—and the release liner has an instruction where to place the warning label. Thus, in broad terms, the release liner provides information causing the reader to act, i.e., providing action-inducing instructional printing.

In the simplest use, the printing on the liner stack can be a bar code and this can vary from label to label. The same variable information can be printed on the labels themselves, as when the labels are being employed for different wares. In the case where the wares are identical and provided in substantial quantity, the entire roll or stack can carry the same variable information, i.e., the variable information is cyclically changed after one or more positions on the liner have been printed.

Other objects and advantages of the invention will be seen in the details of the ensuing specification.

BRIEF DESCRIPTION OF DRAWING

The invention is explained in conjunction with an illustrative embodiment, in the accompanying drawing, in which—

FIG. 1 is a schematic view of label-providing web in the process of being made according to the instant invention and resulting in a zig-zag folded stack;

FIG. 1A is a variant of FIG. 1 wherein the end product is a roll of labels;

FIG. 2 is an enlarged sectional view such as would be seen along the sight line 2—2 applied to FIG. 1; and FIG. 3 is a sectional view such as would be seen along the sight line 3—3 applied to FIG. 2.

DETAILED DESCRIPTION

In the illustration given and with reference first to FIG. 1, the numeral 10 designates generally a continuous web which ultimately becomes the release liner of a label-providing product. The numeral 11 designates generally a continuous web which ultimately provides a series of labels 12.

Referring now to the lower left hand portion of FIG. 1 the continuous web 10 is seen to be advancing along a generally horizontal path and first encounters a print unit generally designated 13. In the illustration given, this print unit may be employed to print "fixed" information such as that designated 13a in FIG. 3. In other words, the information that is "fixed" remains the same in going from one label location or position to the next.

Referring again to FIG. 1, the web 10 is seen next to encounter a second print unit generally designated 14 and which is employed to print variable information as at 14a in FIG. 3. As illustrated, this can be a bar code or any type of variable information which conveys information to be acted upon. Thus, the printed indicia 14a is action-inducing, instructional printing. Normally, the bar code would be "scanned" for a particular purpose such as establishing the price at checkout, inventory control, etc.

Next the advancing web 10 encounters a coating station generally designated 15 and which applies a release coating such as a silicone to the upper face of the web 10. Reference is now made to FIG. 2 which is a section through the completed labeling device and wherein the bottom web is again designated 10. Thereafter, the coating may be dried as at 16. Reference is now made to FIG. 2 which is a section through the completed labeling device and wherein the bottom web is again designated 10. It is imprinted with the variable information as at 14a—in proceeding upwardly in FIG. 2. Over the imprinted variable information 14a, a silicone coating 15a is seen—this being applied at the coating station 15.

The web 10 in advancing further encounters an adhesive applying station as at 17 and which results in applying a coating 17a (see FIG. 2) over the release coating 15a.

Meanwhile, the web 11 ultimately providing the labels 12 is advancing along a parallel generally horizontal path and it also, in the illustration given, passes through a pair of printing stations. The printing station generally designated 18 is available for applying fixed or variable information with the station designated 19 applying the alternative of the fixed or variable information. In some instances the variable printing, or the fixed printing, may be eliminated from the label-providing web 10.

Thereafter, the webs 10 and 11 are merged in a laminating station generally designated 20 (see FIG. 1 in the central portion thereof) and thereafter pass through a die-cutting station generally designated 21. This die-cutting station or operation results in perimetrically cutting the upper web to provide the series of spaced labels 12 and at the same time a "ladder" of unused material from the upper web 11 which is discarded as indicated at 22.

The web 10 which is still continuous and which supports at longitudinally spaced positions the plurality of labels and thereby constitutes a string of labels may be advanced in one embodiment of the invention through a cross perforation station as at 23 and thereafter through a transverse folding station 24 which develops a zig-zag folded stack of labels 25.

Alternatively, the web 10 with its spaced apart labels 12 issuing from the die-cutting station 21 can be rolled into a convolutely wound roll as at 26 in the variant designated FIG. 1A.

The variable or action-inducing instructional printing 15a may be performed for a variety of purposes. As indicated above, an advantageous purpose is the provision of a bar code or other variable data (again as at 14a) which can duplicate a bar code provided by the print station 19 on the upper, exposed surface of the label stock 11. Alternative usages for imprinting the release liner-providing paper stock is to provide instructions, promotional material and the like. However, security objectives are eminently suited to the invention because the provision of the silicone layer over the variable information on the release liner paper effectively prevents any alteration or forging. This coating 15a remains with the release liner, serving to facilitate the removal of the label 12 and the associated pressure sensitive adhesive, i.e., "repositionable" adhesive.

Normally, the labels will be provided in the form of a continuous string, longitudinally spaced apart—either in zig-zag folded form as at 25 or in convolutely wound roll form as at 26. The invention also contemplates alternatives in the application of the variable information 14a. For example, where the label is going to be used on a "big ticket" item, this variable information may change in going from one label position to another. On the other hand, where the stack or roll of labels is to be used for a large number of identical products, the inventive method contemplates producing a roll or stack of labels where the variable information remains the same in going from one position or label location to the next—but wherein the information is cyclically varied. This cyclic variation can occur after a predetermined number of labels have been created or at the end of a stack or roll.

As implied previously, many useful applications may be found for the invention which teaches for the first time the application of printed information under the release coating of a release liner. More particularly, the information provided is "sensible" information, i.e., providing a significant communication to the reader. Other than the security and warning applications already described, it is also possible to use the invention in promotional or advertising activities. For example, a popular form of promotion is to provide a document to the recipient with a coating that has to be scratched off—as with the edge of a coin. This now could be made much easier by the provision of a removable label and the imprinting of "YOU'RE A WINNER" under the label.

While in the foregoing specification a detailed description of the invention has been set down for the purpose of illustration, many variations in the details hereingiven may be made by those skilled in the art without departing from the spirit and scope of the invention.

I claim:

1. In a method of utilizing a label device, the steps of providing a label device comprising a paper layer having upper and lower faces, said upper face being equipped with first variable printed indicia, a release coating on said paper layer upper face over said printed indicia, a pressure sensitive adhesive coating over said release coating, a label over said adhesive coating concealing said first indicia, said label having a lower face engaging said adhesive coating and an exposed upper face, providing second printed indicia on said exposed upper face of said label identical with said first indicia, affixing said paper layer lower face to a surface, removing said label from said paper layer to reveal said concealed first indicia so as to permit verification of the identity of said first and second indicia as part of a transaction and terminating said transaction when said first and second indicia are not identical.

* * * * *